(12) United States Patent
Kamichi et al.

(10) Patent No.: US 7,587,269 B2
(45) Date of Patent: Sep. 8, 2009

(54) POWER OUTPUT APPARATUS, CONTROL METHOD OF POWER OUTPUT APPARATUS, AND VEHICLE EQUIPPED WITH POWER OUTPUT APPARATUS

(75) Inventors: Kensuke Kamichi, Aichi-gun (JP); Akihiro Kimura, Toyota (JP); Daigo Ando, Nisshin (JP); Koichiro Muta, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 11/989,393

(22) PCT Filed: Aug. 25, 2006

(86) PCT No.: PCT/JP2006/316749
§ 371 (c)(1),
(2), (4) Date: Jan. 25, 2008

(87) PCT Pub. No.: WO2007/023952
PCT Pub. Date: Mar. 1, 2007

(65) Prior Publication Data
US 2009/0105924 A1    Apr. 23, 2009

(30) Foreign Application Priority Data
Aug. 25, 2005  (JP)  ............... 2005-244554
Feb. 13, 2006  (JP)  ............... 2006-035168

(51) Int. Cl.
*G06F 19/00*   (2006.01)
*G05D 1/00*    (2006.01)

(52) U.S. Cl. ..................... 701/110; 701/114

(58) Field of Classification Search ............... 701/101, 701/112, 110, 114, 99
See application file for complete search history.

(56) References Cited

U.S. PATENT DOCUMENTS

| | | | |
|---|---|---|---|
| 6,278,915 B1* | 8/2001 | Deguchi et al. | 701/22 |
| 6,704,641 B2* | 3/2004 | Tashiro et al. | 701/110 |
| 7,328,091 B2* | 2/2008 | Kimura | 701/22 |
| 2002/0123407 A1* | 9/2002 | Hanyu et al. | 475/5 |
| 2005/0065693 A1* | 3/2005 | Wang et al. | 701/70 |
| 2006/0015231 A1* | 1/2006 | Yoshimura et al. | 701/48 |
| 2006/0117739 A1 | 6/2006 | Ichimoto et al. | |
| 2007/0243970 A1* | 10/2007 | Amano et al. | 477/3 |

FOREIGN PATENT DOCUMENTS

| | | |
|---|---|---|
| JP | A 10-266886 | 10/1998 |
| JP | A 10-280990 | 10/1998 |
| JP | A 2002-295280 | 10/2002 |
| JP | A 2004-340102 | 12/2004 |

\* cited by examiner

*Primary Examiner*—John T Kwon
(74) *Attorney, Agent, or Firm*—Oliff & Berridge, PLC

(57) ABSTRACT

In response to the driver's depression of a brake pedal in requirement of catalyst deterioration control with a catalyst deterioration control flag Fc set equal to 1, the braking control of the invention controls the operation of a motor to make a rotation speed Ne of an engine approach to a target rotation speed Ne* in a state of continued combustion (firing) of the engine (steps S180 and S190). Such control ensures a quick decrease of the rotation speed Ne of the engine to the target rotation speed Ne*, thus effectively reducing the wasteful fuel consumption due to the continued operation of the engine at a high rotation speed and enhancing the overall energy efficiency of the vehicle.

12 Claims, 10 Drawing Sheets

POWER OUTPUT APPARATUS, CONTROL METHOD OF POWER OUTPUT APPARATUS, AND VEHICLE EQUIPPED WITH POWER OUTPUT APPARATUS

TECHNICAL FIELD

The present invention relates to a power output apparatus, a control method of the power output apparatus, and a vehicle equipped with the power output apparatus.

BACKGROUND ART

One proposed structure of a power output apparatus mounted on a vehicle has an internal combustion engine, a planetary gear unit that has a carrier and a ring gear respectively linked to an output shaft of the internal combustion engine and to an axle of the vehicle, a first motor that outputs power to a sun gear of the planetary gear unit, and a second motor that outputs power to the ring gear (see, for example, Patent Document 1). When the temperature of a catalyst in a catalytic converter used for exhaust emission control of the internal combustion engine increases or exceeds a preset reference temperature, this prior art power output apparatus prohibits cutoff of fuel to the internal combustion engine, with the view to restricting deterioration of the catalyst. In response to the driver's requirement for a braking force in prohibition of the fuel cutoff, this power output apparatus regulates a throttle opening to set an output torque of the internal combustion engine equal to 0, controls the operation of the first motor to keep the rotation speed of the internal combustion engine unchanged, and performs regenerative control of the second motor to output the required braking force.

Patent Document 1: Japanese Patent Laid-Open No. 2004-340102

DISCLOSURE OF THE INVENTION

In this prior art power output apparatus, in response to the driver's request for the braking force in prohibition of the fuel cutoff, the first motor is controlled to keep the rotation speed of the internal combustion engine unchanged as mentioned above. It is assumed that the internal combustion engine is driven at a high rotation speed at this timing. In this case, such control of the first motor may cause high energy consumption and worsen the fuel consumption rate. In response to the driver's subsequent depression of an accelerator pedal, the internal combustion engine is driven in an operating condition of a high rotation speed and a low torque. This undesirably lowers the energy efficiency. In the event of a decrease in vehicle speed with the operation of the internal combustion engine kept at the high rotation speed, the first motor may be rotated at a high rotation speed or even at an over rotation speed on some occasions.

In the power output apparatus of the invention, the control method of the power output apparatus, and the vehicle equipped with the power output apparatus, there is accordingly a demand of ensuring a quick decrease in rotation speed of the internal combustion engine with continued operation of the internal combustion engine, in response to the driver's requirement for a braking force in prohibition of cutoff of the fuel supply to the internal combustion engine. In the power output apparatus of the invention, the control method of the power output apparatus, and the vehicle equipped with the power output apparatus, there is also a demand of enhancing the energy efficiency in prohibition of cutoff of the fuel supply to the internal combustion engine.

At least part of the above and the other related demands is attained by a power output apparatus, a control method of the power output apparatus, and a vehicle equipped with the power output apparatus having the configurations discussed below.

According to one aspect, the present invention is directed to a power output apparatus that outputs power to a driveshaft. The power output apparatus includes: an internal combustion engine; an electric power-mechanical power input output structure that is connected to an output shaft of the internal combustion engine and to the driveshaft and outputs at least part of output power of the internal combustion engine to the driveshaft through input and output of electric power and mechanical power; a motor that inputs and outputs power to and from the driveshaft; an accumulator unit that transmits electric power from and to the electric power-mechanical power input output structure and the motor; a driving force demand setting module that sets a driving force demand to be output to the driveshaft; a target operating condition setting module that, upon failure of a continued combustion condition of continuing combustion in the internal combustion engine, sets a target operating condition of the internal combustion engine including an intermittent operation of the internal combustion engine based on the set driving force demand, while upon satisfaction of the continued combustion condition, continuing operation of the internal combustion engine and setting the target operating condition of the internal combustion engine based on the set driving force demand; and a control module that, in a state other than a specific driving state of applying a braking force or a small load to the driveshaft upon satisfaction of the continued combustion condition, performs continued medium-high load combustion control which controls the internal combustion engine, the electric power-mechanical power input output structure, and the motor to drive the internal combustion engine in the set target operating condition and to ensure output of a driving force equivalent to the set driving force demand to the driveshaft, in the specific driving state, the control module performing continued low load combustion control which controls the internal combustion engine, the electric power-mechanical power input output structure, and the motor to drive the internal combustion engine in the set target operating condition with continued combustion in the internal combustion engine and to ensure output of a driving force equivalent to the set driving force demand to the driveshaft.

Upon failure of the continued combustion condition of continuing combustion in the internal combustion engine, the power output apparatus according to this aspect of the invention sets the target operating condition of the internal combustion engine including the intermittent operation of the internal combustion engine based on the driving force demand that is to be output to the driveshaft. Upon satisfaction of the continued combustion condition, on the other hand, the power output apparatus continues operation of the internal combustion engine and sets the target operating condition of the internal combustion engine based on the driving force demand. In the state other than the specific driving state of applying a braking force or a small load to the driveshaft upon satisfaction of the continued combustion condition, the power output apparatus performs the continued medium-high load combustion control which controls the internal combustion engine, the electric power-mechanical power input output structure, and the motor to drive the internal combustion engine in the set target operating condition and to ensure output of a driving force equivalent to the driving force demand to the driveshaft. Such control ensures output of a driving force equivalent to the driving force demand to the driveshaft, while driving the internal combustion engine in the set target operating condition with intermittent operation of the internal combustion engine. In the specific driving state, on the other hand, the power output apparatus performs the continued low load combustion control which controls the internal combustion engine, the electric power-mechanical power input output structure, and the motor to drive the internal combustion engine in the set target operating condition with continued combustion in the internal combustion engine and to ensure output of a driving force equivalent to the set driving force demand to the driveshaft. Such control enables the internal combustion engine to be driven in the target operating condition with continued combustion, while ensuring output of the driving force equivalent to the braking force demand to the driveshaft. When the target operating condition of the internal combustion engine upon satisfaction of the continued combustion condition is an operating condition of a relatively low rotation speed, the power output apparatus enables the internal combustion engine to be driven in the target operating condition of the relatively low rotation speed with continued combustion. This arrangement effectively reduces the wasteful fuel consumption and thereby enhances the overall energy efficiency of the power output apparatus.

In one preferable application of the power output apparatus of the invention, in the specific driving state, the target operating condition setting module sets the target operating condition of the internal combustion engine to a preset driving condition of attaining self-sustained operation of the internal combustion engine at a preset rotation speed. This arrangement interferes with output of power to the driveshaft via the electric power-mechanical power input output structure in the course of controlling the internal combustion engine to be driven in the target operating condition. There is accordingly no need of outputting an excess braking force from the motor.

In another preferable application of the power output apparatus of the invention, in the specific driving state, the control module controls the internal combustion engine, the electric power-mechanical power input output structure, and the motor to change an operating condition of the internal combustion engine in a range of allowing continued combustion of the internal combustion engine and thereby make the operating condition of the internal combustion engine approach to the set target operating condition. This arrangement enables the operating condition of the internal combustion engine to approach to the target operating condition with continued combustion of the internal combustion engine. In one preferable example, the control module in the specific driving state may control the internal combustion engine, the electric power-mechanical power input output structure, and the motor to change the operating condition of the internal combustion engine to the set target operating condition by a preset rotation speed per unit time.

In one preferable embodiment according to this aspect of the invention, the power output apparatus further has an input limit setting module that sets an input limit of the accumulator unit as a maximum power level of allowing charge of the accumulator unit, based on a state of the accumulator unit. In this embodiment, the control module controls the internal combustion engine, the electric power-mechanical power input output structure, and the motor in a range of the set input limit of the accumulator unit. This arrangement effectively prevents the accumulator unit from being overcharged with excess electric power. The power output apparatus of this embodiment preferably has a charge-discharge electric power detector that measures a charge-discharge electric power of charging the accumulator unit or being discharged from the accumulator unit. When execution of the continued low load combustion control to limit the measured charge-discharge electric power in the range of the set input limit of the accumulator unit in the specific driving state makes it impossible to drive the internal combustion engine in the set target operating condition, the control module performs fuel cutoff control of stopping fuel injection in the internal combustion engine to enable the internal combustion engine to be driven in the target operating condition. This arrangement ensures the operation of the internal combustion engine in the target operating condition. In one preferable example of this embodiment, the control module controls the internal combustion engine, the electric power-mechanical power input output structure, and the motor to change a rotation speed of the internal combustion engine by a preset rotation speed per unit time in the course of the fuel cutoff control of stopping fuel injection in the internal combustion engine to enable the internal combustion engine to be driven in the target operating condition. This arrangement effectively prevents an abrupt change of the rotation speed of the internal combustion engine and avoids potential troubles caused by the abrupt change of the rotation speed of the internal combustion engine, for example, a potential torque shock.

In one preferable embodiment of the power output apparatus according to this aspect of the invention, the internal combustion engine is equipped with an emission control device that uses a catalyst for exhaust emission control. The continued combustion condition may be a condition of performing catalyst deterioration control to restrict deterioration of the catalyst used in the emission control device. This arrangement effectively prevents the deterioration of the catalyst in the emission control device.

In another preferable embodiment of the power output apparatus according to this aspect of the invention, the electric power-mechanical power input output structure has: a three shaft-type power input output mechanism that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

According to another aspect, the present invention is directed to a vehicle that is equipped with the power output apparatus having any of the above arrangements and has an axle linked to the driveshaft. Here the power output apparatus mounted on the vehicle outputs power to a driveshaft and fundamentally includes: an internal combustion engine; an electric power-mechanical power input output structure that is connected to an output shaft of the internal combustion engine and to the driveshaft and outputs at least part of output power of the internal combustion engine to the driveshaft through input and output of electric power and mechanical power; a motor that inputs and outputs power to and from the driveshaft; and an accumulator unit that transmits electric power from and to the electric power-mechanical power input output structure and the motor. The power output apparatus further has: a driving force demand setting module that sets a driving force demand to be output to the driveshaft; a target operating condition setting module; and a control module. Upon failure of a continued combustion condition of continuing combustion in the internal combustion engine, the target operating condition setting module sets a target operating condition of the internal combustion engine including an intermittent operation of the internal combustion engine based on the set driving force demand. Upon satisfaction of the continued combustion condition, the target operating condition setting module continues operation of the internal combustion engine and sets the target operating condition of the internal combustion engine based on the set driving force demand. In a state other than a specific driving state of applying a braking force or a small load to the driveshaft upon satisfaction of the continued combustion condition, the control module performs continued medium-high load combustion control which controls the internal combustion engine, the electric power-mechanical power input output structure, and the motor to drive the internal combustion engine in the set target operating condition and to ensure output of a driving force equivalent to the set driving force demand to the driveshaft. In the specific driving state, the control module performs continued low load combustion control which controls the internal combustion engine, the electric power-mechanical power input output structure, and the motor to drive the internal combustion engine in the set target operating condition with continued combustion in the internal combustion engine and to ensure output of a driving force equivalent to the set driving force demand to the driveshaft.

The vehicle according to this aspect of the invention is equipped with the power output apparatus having any of the above arrangements and thus exerts the similar effects to those of the power output apparatus described above. Namely the vehicle ensures output of a driving force equivalent to the driving force demand to the driveshaft, while driving the internal combustion engine in the set target operating condition with the intermittent operation of the internal combustion engine. The vehicle also enables the internal combustion engine to be driven in the target operating condition with continued combustion, while ensuring output of a driving force equivalent to the braking force demand to the driveshaft. The vehicle enables the internal combustion engine to be driven in the target operating condition of the relatively low rotation speed with continued combustion. This arrangement effectively reduces the wasteful fuel consumption and thereby enhances the overall energy efficiency of the power output apparatus.

According to still another aspect, the present invention is directed to a control method of a power output apparatus. The power output apparatus has: an internal combustion engine; an electric power-mechanical power input output structure that is connected to an output shaft of the internal combustion engine and to the driveshaft and outputs at least part of output power of the internal combustion engine to the driveshaft through input and output of electric power and mechanical power; a motor that inputs and outputs power to and from the driveshaft; and an accumulator unit that transmits electric power from and to the electric power-mechanical power input output structure and the motor. The control method of the power output apparatus has step (a) of: upon failure of a continued combustion condition of continuing combustion in the internal combustion engine, setting a target operating condition of the internal combustion engine including an intermittent operation of the internal combustion engine based on a driving force demand that is to be output to the driveshaft, while upon satisfaction of the continued combustion condition, continuing operation of the internal combustion engine and setting the target operating condition of the internal combustion engine based on the driving force demand. The control method of the power output apparatus also has step (b) of: in a state other than a specific driving state of applying a braking force or a small load to the driveshaft upon satisfaction of the continued combustion condition, performing continued medium-high load combustion control which controls the internal combustion engine, the electric power-mechanical power input output structure, and the motor to drive the internal combustion engine in the set target operating condition and to ensure output of a driving force equivalent to the driving force demand to the driveshaft. In the specific driving state, the step (b) performs continued low load combustion control which controls the internal combustion engine, the electric power-mechanical power input output structure, and the motor to drive the internal combustion engine in the set target operating condition with continued combustion in the internal combustion engine and to ensure output of a driving force equivalent to the driving force demand to the driveshaft.

Upon failure of the continued combustion condition of continuing combustion in the internal combustion engine, the control method of the power output apparatus according to this aspect of the invention sets the target operating condition of the internal combustion engine including the intermittent operation of the internal combustion engine based on the driving force demand that is to be output to the driveshaft. Upon satisfaction of the continued combustion condition, on the other hand, the control method of the power output apparatus continues operation of the internal combustion engine and sets the target operating condition of the internal combustion engine based on the driving force demand. In the state other than the specific driving state of applying a braking force or a small load to the driveshaft upon satisfaction of the continued combustion condition, the control method of the power output apparatus performs the continued medium-high load combustion control which controls the internal combustion engine, the electric power-mechanical power input output structure, and the motor to drive the internal combustion engine in the set target operating condition and to ensure output of a driving force equivalent to the driving force demand to the driveshaft. Such control ensures output of a driving force equivalent to the driving force demand to the driveshaft, while driving the internal combustion engine in the set target operating condition with intermittent operation of the internal combustion engine. In the specific driving state, on the other hand, the control method of the power output apparatus performs the continued low load combustion control which controls the internal combustion engine, the electric power-mechanical power input output structure, and the motor to drive the internal combustion engine in the set target operating condition: with continued combustion in the internal combustion engine and to ensure output of a driving force equivalent to the set driving force demand to the driveshaft. Such control enables the internal combustion engine to be driven in the target operating condition with continued combustion, while ensuring output of the driving force equivalent to the braking force demand to the driveshaft. When the target operating condition of the internal combustion engine upon satisfaction of the continued combustion condition is an operating condition of a relatively low rotation speed, the control method of the power output apparatus enables the internal combustion engine to be driven in the target operating condition of the relatively low rotation speed with continued combustion. This arrangement effectively reduces the wasteful fuel consumption and thereby enhances the overall energy efficiency of the power output apparatus.

In one preferable application of the control method of the invention, when execution of the continued low load combustion control to limit a charge-discharge electric power of charging the accumulator unit or being discharged from the accumulator unit in the range of an input limit of the accumulator unit in the specific driving state makes it impossible to drive the internal combustion engine in the set target operating condition, the step (b) performs fuel cutoff control of stopping fuel injection in the internal combustion engine to enable the internal combustion engine to be driven in the target operating condition. This arrangement effectively drives the internal combustion engine in the target operation condition in the state of preventing the accumulator unit from being overcharged with excess electric power.

BEST MODES OF CARRYING OUT THE INVENTION

Figure 1:
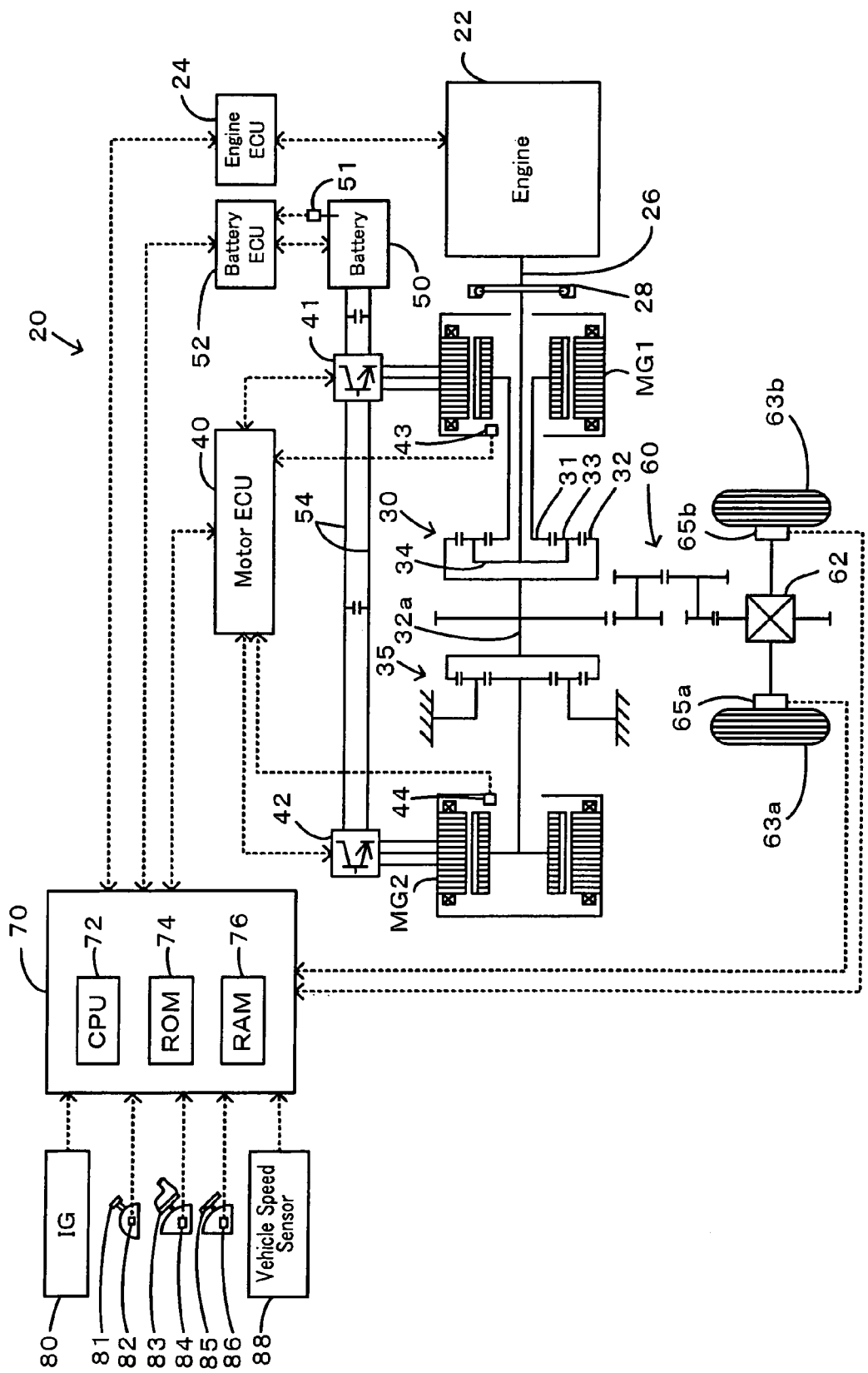
FIG. 1 schematically illustrates the configuration of a hybrid vehicle 20 equipped with a power output apparatus in a first embodiment of the invention.

Some modes of carrying out the invention are described below as preferred embodiments with reference to the accompanied drawings. FIG. 1 schematically illustrates the configuration of a hybrid vehicle 20 equipped with a power output apparatus in a first embodiment of the invention. As illustrated, the hybrid vehicle 20 of the embodiment includes an engine 22, a power distribution integration mechanism 30 as a planetary gear mechanism having its carrier 34 that rotates pinion gears 33 and is linked to a crankshaft 26 or an output shaft of the engine 22 via a damper 28, a motor MG1 that is linked to a sun gear 31 of the power distribution integration mechanism 30 and has power generation capability, a motor MG2 that is linked via a reduction gear 35 to a ring gear shaft 32a or a driveshaft connecting with a ring gear 32 of the power distribution integration mechanism 30, and a hybrid electronic control unit 70 that controls the operations of the whole hybrid vehicle 20. The ring gear shaft 32a or the driveshaft is linked to drive wheels 63a and 63b via a gear mechanism 60 and a differential gear 62. The power output to the ring gear shaft 32a is used for driving the hybrid vehicle 20.

Figure 2:
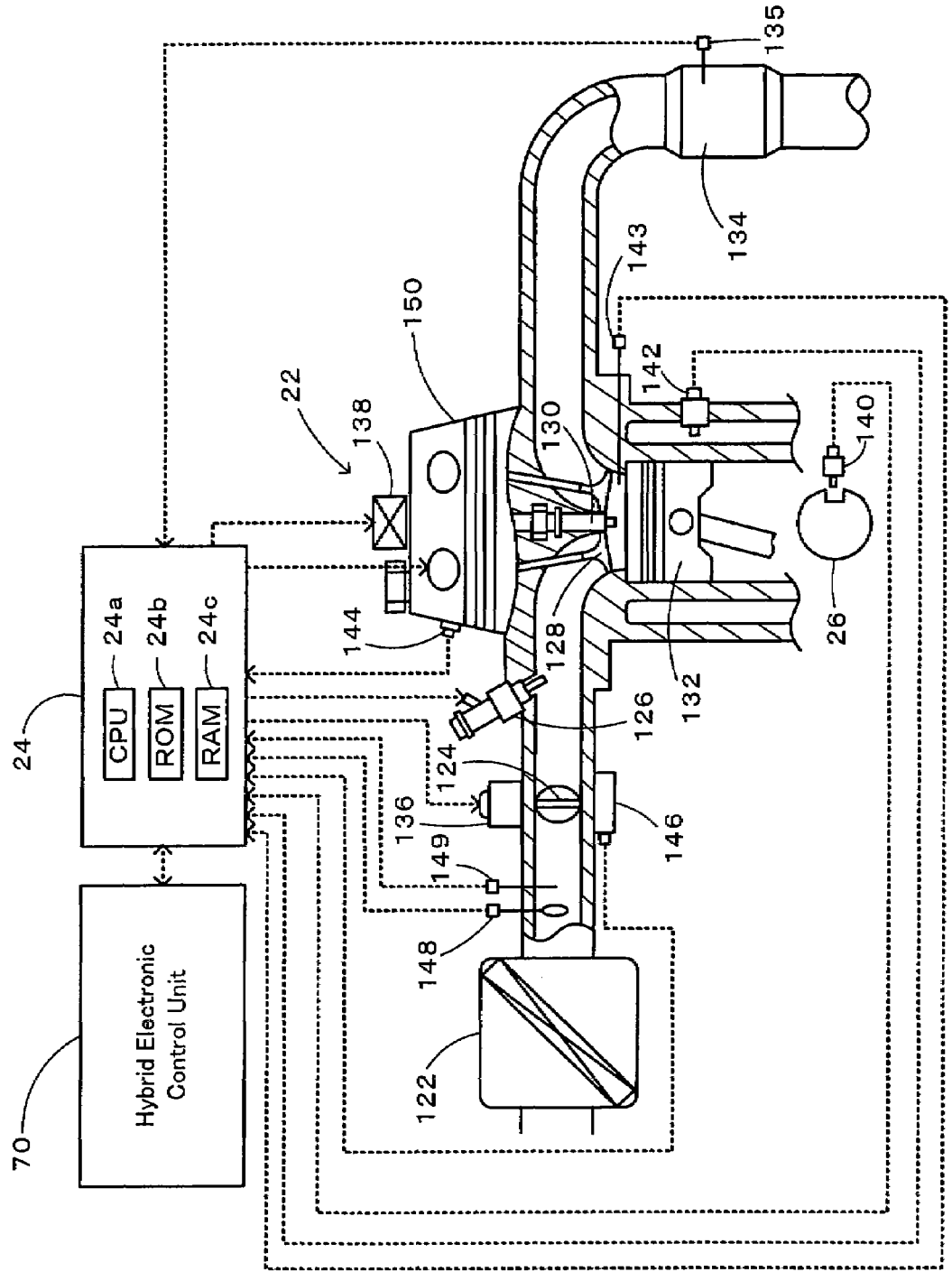
FIG. 2 schematically shows the structure of an engine 22.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24. The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, signals from various sensors that measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a catalyst bed temperature from a temperature sensor 135 attached to the catalytic converter 134, and an in-cylinder pressure from a pressure sensor 143 located inside the combustion chamber. The input signals also include a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the position of the throttle valve 124, an air flow meter signal from an air flow meter 148 attached to an air intake conduit, and an intake air temperature from a temperature sensor 149 attached to the air intake conduit. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 computes a remaining charge level or current state of charge (SOC) of the battery 50. The battery ECU 52 also computes a charge discharge power demand Pb* as a required power level for charging or discharging the battery 50, based on the computed state of charge (SOC), the input battery temperature Tb, and input and output limits Win and Wout of the battery 50. The battery ECU 52 outputs these and other data regarding the operating conditions of the battery 50 by communication to the hybrid electronic control unit 70 according to the requirements.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88, and wheel speeds Vwa to Vwd from wheel speed sensors 65a to 65d attached to the drive wheels 63a and 63b and driven wheels 63c and 63d (not shown). The hybrid electronic control unit 70 communicates with the engine ECU 24, the motor ECU 40, and the battery ECU 52 via its communication port to receive and send the diversity of control signals and data from and to the engine ECU 24, the motor ECU 40, and the battery ECU 52 as mentioned above.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
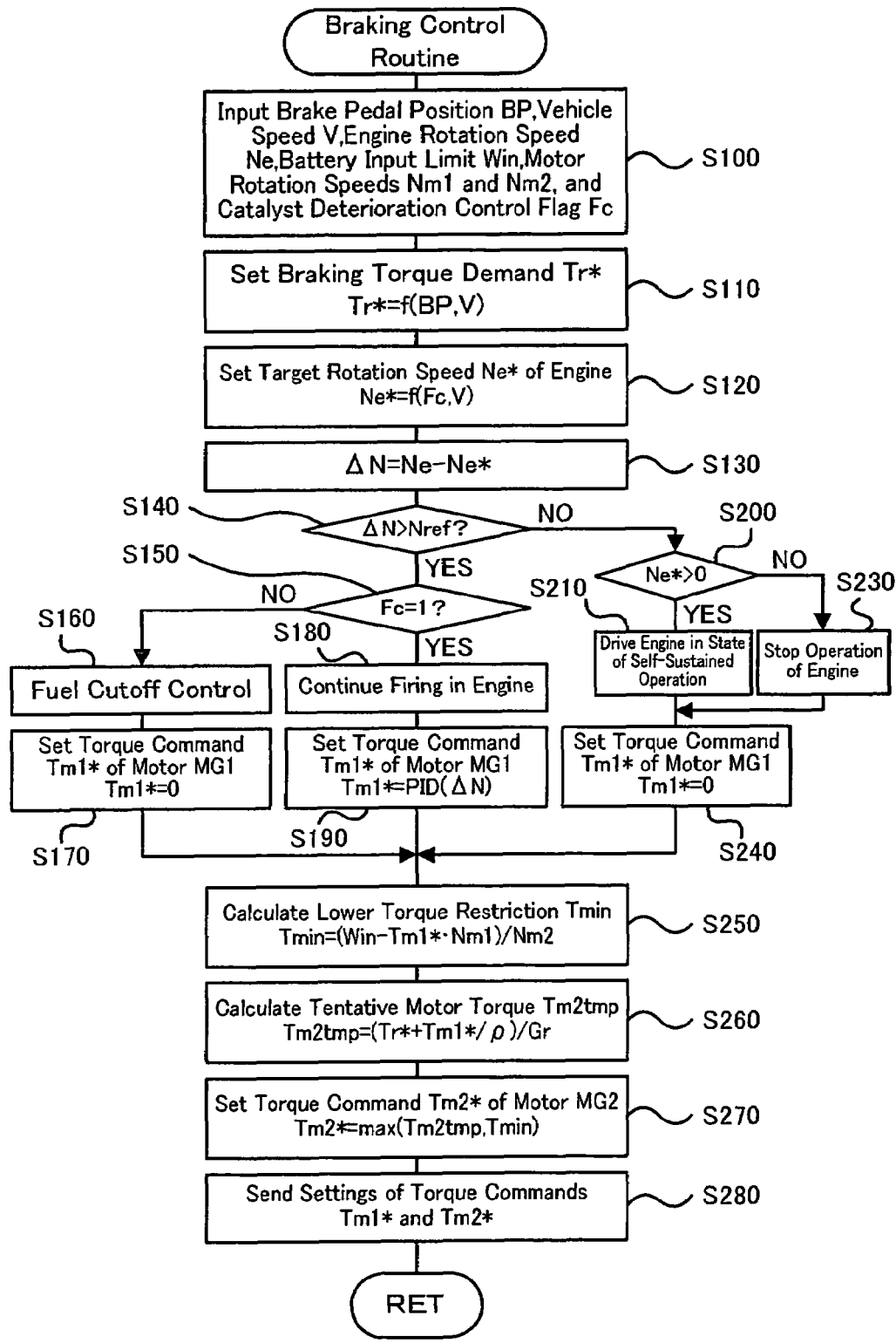
FIG. 3 is a flowchart showing a braking control routine executed by a hybrid electronic control unit 70 in the first embodiment.

The description regards the operations of the hybrid vehicle 20 of the embodiment having the configuration discussed above, especially a series of operations under low load or under application of a braking force in response to the driver's release of the accelerator pedal 83 or the driver's depression of the brake pedal 85 during execution of catalyst deterioration control triggered by an increase in temperature of a catalyst bed in the catalytic converter 134. The procedure of catalyst deterioration control in the embodiment prohibits the cutoff of fuel to the engine 22 and thereby prevents a large mass of the air from being introduced into the catalytic converter 134 and further increasing the temperature of the catalyst bed in the catalytic converter 134. Even when power output from the engine 22 is not required, for example, during braking of the vehicle or in the case of a low power demand for the vehicle, the catalyst deterioration control continues the fuel supply to the engine 22 for ignition (firing) of the air-fuel mixture. The catalyst deterioration control is executed by the hybrid electronic control unit 70 in response to setting of a catalyst restriction control flag Fc to 1. The engine ECU 24 executes a catalyst deterioration control flag setting routine (not shown) to set the catalyst restriction control flag Fc to 1 when the catalyst bed temperature from the temperature sensor 135 attached to the catalytic converter 134 reaches or exceeds a preset reference temperature. FIG. 3 is a flowchart showing a braking control routine executed by the hybrid electronic control unit 70 as part of vehicle braking drive control including this catalyst deterioration control. This braking control routine is repeatedly performed at preset time intervals (for example, at every several msec).

In the braking control routine, the CPU 72 of the hybrid electronic control unit 70 first inputs various data required for control, that is, the brake pedal position BP from the brake pedal position sensor 86, the vehicle speed V from the vehicle speed sensor 88, a rotation speed Ne of the engine 22, rotation speeds Nm1 and Nm2 of the motors MG1 and MG2, the setting of the catalyst deterioration control flag Fc, and the input limit Win of the battery 50 (step S100). The rotation speed Ne of the engine 22 is computed from the output signal of the crank position sensor 140 attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The catalyst deterioration control flag Fc is set as mentioned above and is received from the engine ECU 24 by communication. The input limit Win of the battery 50 is set based on the state of charge (SOC) of the battery 50 and is received from the battery ECU 52 by communication.

Figure 4:
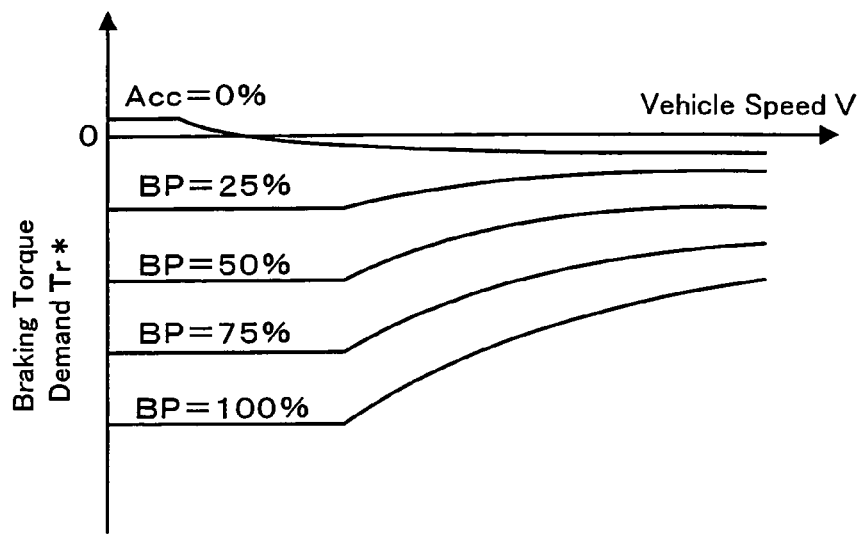
FIG. 4 shows one example of a braking torque demand setting map.

After the data input, the CPU 72 sets a braking torque demand Tr* to be output to the ring gear shaft 32a or the driveshaft linked to the drive wheels 63a and 63b as a braking torque required for the hybrid vehicle 20, based on the input brake pedal position BP and the input vehicle speed V (step S110) A concrete procedure of setting the braking torque demand Tr* in this embodiment stores in advance variations in braking torque demand Tr* against the brake pedal position BP and the vehicle speed V as a braking torque demand setting map in the ROM 74 and reads the braking torque demand Tr* corresponding to the given brake pedal position BP and the given vehicle speed V from this braking torque demand setting map. One example of the braking torque demand setting map is shown in FIG. 4.

The CPU 72 subsequently sets a target rotation speed Ne* of the engine 22, based on the setting of the catalyst deterioration control flag Fc and the input vehicle speed V (step S120). Although the power output from the engine 22 is not required during braking of the vehicle, the target rotation speed Ne* of the engine 22 is set corresponding to the vehicle speed V to prepare for quick power output from the engine 22 in response to the driver's subsequent depression of the accelerator pedal 83. For example, in the setting of the catalyst deterioration control flag Fc to 0 (with no requirement for the catalyst deterioration control), the target rotation speed Ne* of the engine 22 is set equal to 0 to stop the operation of the engine 22 at the vehicle speed V of lower than a preset reference vehicle speed (for example, 10 km/h or 20 km/h). In the setting of the catalyst deterioration control flag Fc to 0, the target rotation speed Ne* is set equal to a predetermined rotation speed level (for example, 800 rpm or 1000 rpm) at the vehicle speed V of not lower than the preset reference vehicle speed. In the setting of the catalyst deterioration control flag Fc to 1 (with requirement for the catalyst deterioration control), on the other hand, the target rotation speed Ne* is set equal to a predetermined rotation speed level (for example, 800 rpm or 1000 rpm).

The CPU 72 then calculates a rotation speed difference ΔN between the input rotation speed Ne and the computed target rotation speed Ne* of the engine 22 (step S130) and compares the calculated rotation speed difference ΔN with a predetermined threshold value Nref (step S140). The threshold value Nref represents a certain rotation speed difference from the target rotation speed Ne*, which ensures easy self-sustained operation of the engine 22 at the target rotation speed Ne* without active control of the rotation speed by means of the motor MG1 and is set equal to a relatively small value.

It is assumed here that the driver continuously steps on the accelerator pedal 83 to drive the engine 22 at a relatively high rotation speed and increase the vehicle speed V to a relatively high level, and then releases the accelerator pedal 83 and lightly steps on the brake pedal 85. In this state, the target rotation speed Ne* is set to a relatively low rotation speed, so that the rotation speed difference ΔN is greater than the predetermined threshold value Nref. It is then identified whether the catalyst deterioration control flag Fc is equal to 1 (step S150). Upon identification of the catalyst deterioration control flag Fc equal to 0, that is, in no requirement for the catalyst deterioration control, the CPU 72 instructs the engine ECU 24 to perform fuel cutoff control and temporarily stop the fuel supply to the engine 22 (step S160) and sets '0' to a torque command Tm1* of the motor MG1 (step S170). A concrete procedure of the fuel cutoff control sends a control signal for the fuel cutoff to the engine ECU 24. The engine ECU 24 receives the control signal and stops the fuel injection and the ignition or firing. After setting the torque command Tm1* of the motor MG1, the CPU 72 divides a difference between the input limit Win of the battery 50 and a power consumption (power generation) of the motor MG1 by the rotation speed Nm2 of the motor MG2 to calculate a lower torque restriction Tmin as a minimum torque that may be output from the motor MG2 according to Equation (1) given below (step S250). Here the power consumption or the power generation of the motor MG1 is determined by multiplying the set torque command Tm1* (equal to 0 in the current state) of the motor MG1 by the current rotation speed Nm1 of the motor MG1:

$$T\text{min}=(W\text{in}-Tm1*\cdot Nm1)/Nm2 \quad (1)$$

The CPU 72 also calculates a tentative motor torque Tm2tmp as a torque to be output from the motor MG2, from the braking torque demand Tr*, the torque command Tm1*, and a gear ratio ρ of the power distribution integration mechanism 30 according to Equation (2) given below (step S260):

$$Tm2tmp=(Tr*+Tm1*/\rho)/Gr \quad (2)$$

Figure 5:
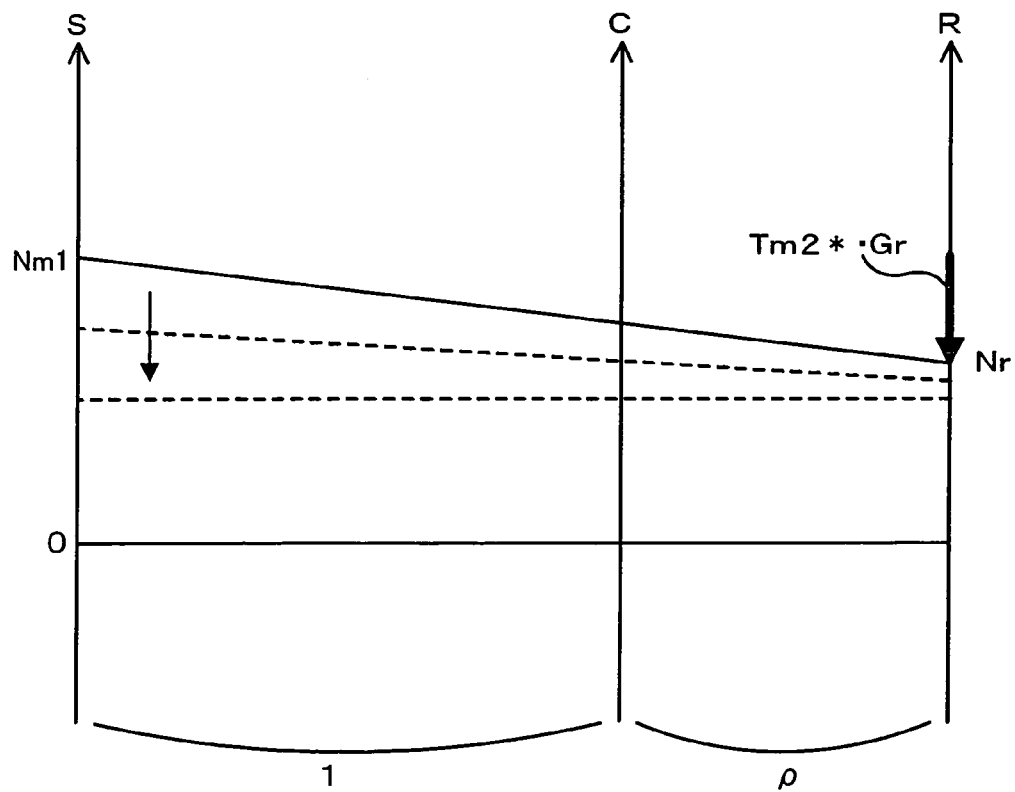
FIG. 5 is an alignment chart showing torque-rotation speed dynamics of respective rotational elements of a power distribution integration mechanism 30 in the course of braking with the cutoff of fuel to the engine 22.

The CPU 72 sets a torque command Tm2* of the motor MG2 by limiting the calculated tentative motor torque Tm2tmp to the calculated lower torque restriction Tmin (step S270) and sends the settings of the torque commands Tm1* and Tm2* of the motors MG1 and MG2 to the motor ECU 40 (step S280). The braking control routine is then terminated. The motor ECU 40 receives the settings of the torque commands Tm1* and Tm2* and performs switching control of the switching elements included in the respective inverters 41 and 42 to drive the motor MG1 with the torque command Tm1* and the motor MG2 with the torque command Tm2*. FIG. 5 is an alignment chart showing torque-rotation speed dynamics of the respective rotational elements of the power distribution integration mechanism 30 in the course of braking with the cutoff of fuel to the engine 22. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by a gear ratio Gr of the reduction gear 35. A thick arrow on the axis 'R' represents a torque applied to the ring gear shaft 32a when the motor MG2 is driven with the torque command Tm2*. A solid line represents a collinear relation in response to the driver's depression of the brake pedal 85. Broken lines show time changes of the collinear relation. As clearly shown in this alignment chart, the rotation speed Ne of the engine 22 is lowered by the fuel cutoff control. Equation (2) given above is readily introduced from this alignment chart.

Upon identification of the catalyst deterioration control flag Fc equal to 1 at step S150, that is, in requirement for the catalyst deterioration control, on the other hand, the CPU 72 instructs the engine ECU 24 to continue the combustion (firing) in the engine 22 (step S180). The CPU 72 subsequently computes and sets the torque command Tm1* of the motor MG1 according to Equation (3) given below to make the rotation speed Ne of the engine 22 approach to the target rotation speed Ne* in the state of continued combustion (step S190):

$$Tm1^* = k1 \cdot \Delta N + k2 \int \Delta N \cdot dt \quad (3)$$

Figure 6:
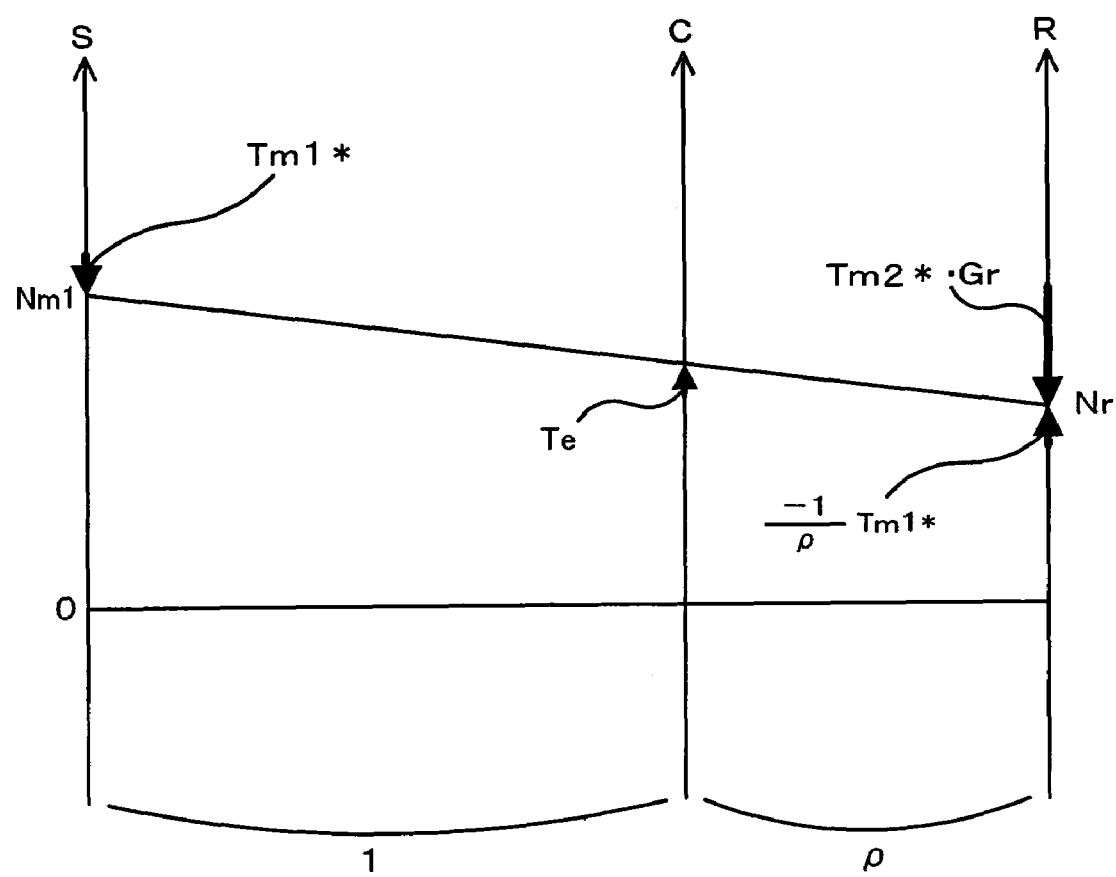
FIG. 6 is an alignment chart showing torque-rotation speed dynamics of the respective rotational elements of the power distribution integration mechanism 30 in the course of braking with the continued combustion in the engine 22.

The CPU 72 then sets the torque command Tm2* of the motor MG2 based on the torque command Tm1* of the motor MG1 (steps S250 to S270), sends the settings of the torque commands Tm1* and Tm2* of the motors MG1 and MG2 to the motor ECU 40 (step S280), and exits from this braking control routine. A concrete procedure of continuing the combustion in the engine 22 sends a control signal for the continued combustion to the engine ECU 24. The engine ECU 24 receives the control signal and performs the fuel injection control and the ignition control to attain a slightly greater amount of fuel injection, compared with the amount of fuel injection in the state of self-sustained operation of the engine 22 at the rotation speed Ne. A low torque is accordingly output from the engine 22. Equation (3) is a relational expression of feedback control to make the rotation speed Ne of the engine 22 approach to the target rotation speed Ne* with the continued combustion in the engine 22. In Equation (3) given above, 'k1' in the first term and 'k2' in the second term on the right side respectively denote a gain of the proportional and a gain of the integral term. For the continued combustion in the engine 22, these gains 'k1' and 'k2' are set to relatively small values, compared with the values in the state of output of a relatively large torque from the engine 22. FIG. 6 is an alignment chart showing torque-rotation speed dynamics of the respective rotational elements of the power distribution integration mechanism 30 in the course of braking with the continued combustion in the engine 22. In this state, the rotation speed Ne of the engine 22 is made to approach to the target rotation speed Ne* by the drive control of the motor MG1 with the continued combustion in the engine 22. Such control ensures a quick decrease of the rotation speed Ne of the engine 22 to the target rotation speed Ne*. In this state, a small torque is output from the engine 22, and a torque corresponding to the small output torque is applied to the ring gear shaft 32a. A cancellation torque for canceling out the torque applied to the ring gear shaft 32a is accordingly added to the braking torque demand Tr* to be output from the motor MG2.

Regardless of the requirement or the non-requirement for the catalyst deterioration control, when it is determined at step S140 that the rotation speed difference ΔN is not greater than the predetermined threshold value Nref, the CPU 72 checks the setting of the target rotation speed Ne* (step S200). When the target rotation speed Ne* is not equal to 0, the CPU 72 instructs the engine ECU 24 to drive the engine 22 in the state of self-sustained operation at the target rotation speed Ne* without torque output (step S210). When the target rotation speed Ne* is equal to 0, on the other hand, the CPU 72 instructs the engine ECU 24 to stop the operation of the engine 22 (step S230). The CPU 72 then sets '0' to the torque command Tm1* of the motor MG1 (step S240), sets the torque command Tm2* of the motor MG2 based on the torque command Tm1* of the motor MG1 (steps S250 to S270), and sends the settings of the torque commands Tm1* and Tm2* of the motors MG1 and MG2 to the motor ECU 40 (step S280). The braking control routine is then terminated. When the target rotation speed Ne* is not equal to 0, the engine 22 is driven in the state of self-sustained operation at the target rotation speed Ne*.

Figure 7:
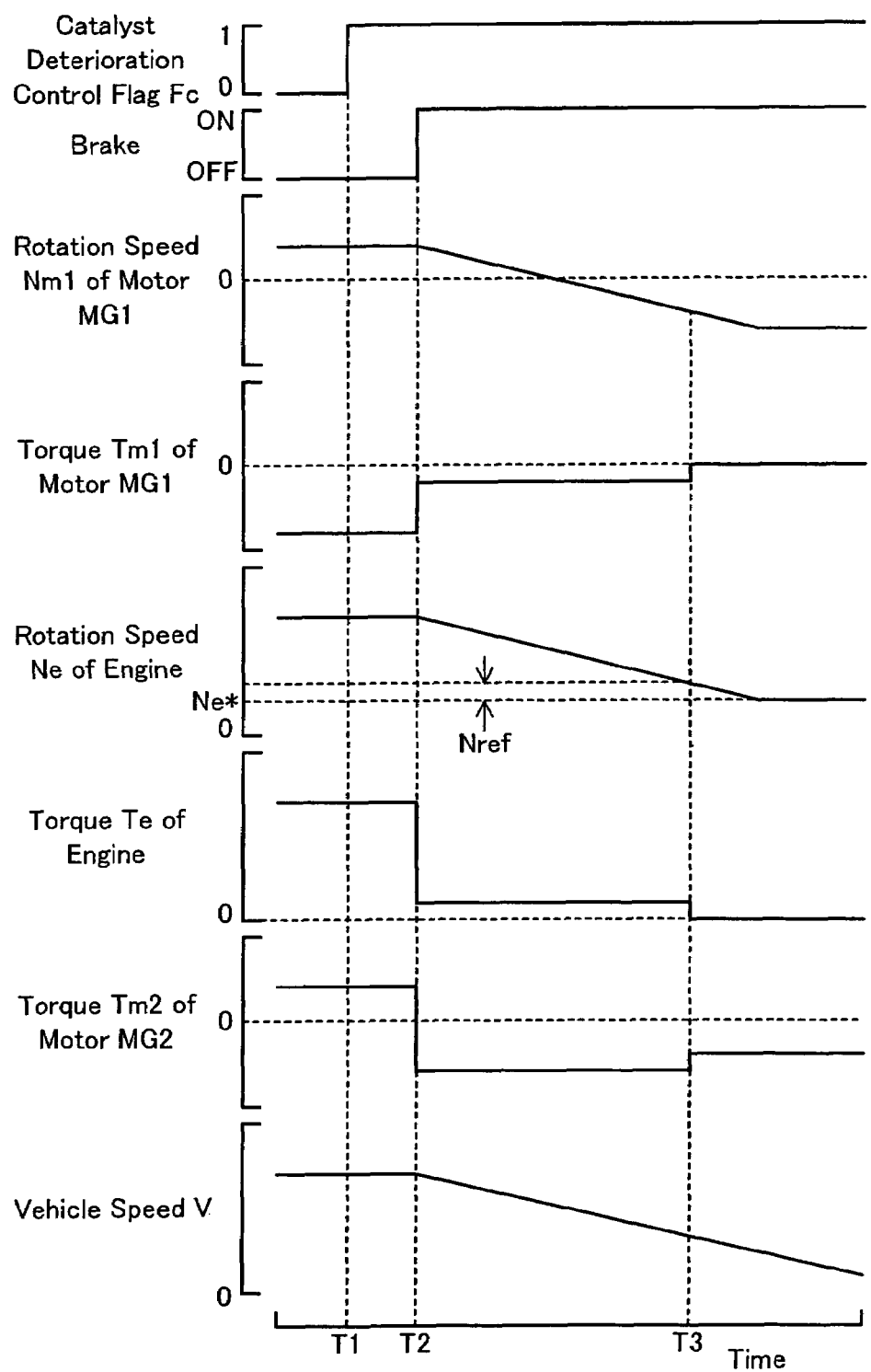
FIG. 7 shows time changes of respective conditions of the engine 22 and motors MG1 and MG2 at a braking time in response to a driver's depression of a brake pedal 85 in a catalyst deterioration control flag Fc set equal to 1.

FIG. 7 shows time changes of the respective conditions of the engine 22 and the motors MG1 and MG2 at the braking time in response to the driver's depression of the brake pedal 85 in the catalyst deterioration control flag Fc set equal to 1. In the time chart of this illustrated example, the catalyst deterioration control flag Fc is set equal to 1 at a time point T1 with an increase in temperature of the catalyst bed in the catalytic converter 134. The driver steps on the brake pedal 85 at a time point T2 after the time point T1. The torque command Tm1* of the motor MG1 is set to a torque based on the rotation speed difference ΔN between the current rotation speed Ne and the target rotation speed Ne* of the engine 22, in order to decrease the rotation speed Ne of the engine 22 to the target rotation speed Ne* in the state of continued combustion (firing) in the engine 22. The engine 22 accordingly lowers its rotation speed Ne with output of a small torque. The torque output from the motor MG2 satisfies the braking torque demand Tr* with the additional cancellation torque for canceling out the torque applied to the ring gear shaft 32a corresponding to the torque output from the motor MG1. Such torque output gradually lowers the vehicle speed V. At a time point T3 when the rotation speed difference ΔN between the current rotation speed Ne and the target rotation speed Ne* of the engine 22 reaches the predetermined threshold value Nref, the engine 22 is driven in the state of self-sustained operation, and the torque command Tm1* of the motor MG1 is set equal to 0. The torque output from the motor MG2 accordingly satisfies the braking torque demand Tr*.

In the hybrid vehicle 20 of the embodiment described above, in response to the driver's release of the accelerator pedal 83 and subsequent depression of the brake pedal 85 in requirement for the catalyst deterioration control with the catalyst deterioration control flag Fc set equal to 1, the motor MG1 is controlled to make the rotation speed Ne of the engine 22 approach to the target rotation speed Ne* in the state of continued combustion (firing) in the engine 22. Such control ensures a quick decrease of the rotation speed Ne of the engine 22 to the target rotation speed Ne*, thus effectively reducing the wasteful fuel consumption and enhancing the overall energy efficiency of the hybrid vehicle 20.

In the hybrid vehicle 20 of the embodiment, in response to the driver's depression of the brake pedal 85 in requirement of the catalyst deterioration control with the catalyst deterioration control flag Fc set equal to 1, the torque command Tm1* of the motor MG1 is set according to the relational expression of feedback control to make the rotation speed Ne of the engine 22 approach to the target rotation speed Ne* in the state of continued combustion (firing) in the engine 22. One possible modification may control the motor MG1 to change the rotation speed Ne of the engine 22 toward the target rotation speed Ne* by every specific rotation speed per unit time.

In the hybrid vehicle 20 of the embodiment, in response to the driver's depression of the brake pedal 85 in requirement of the catalyst deterioration control with the catalyst deterioration control flag Fc set equal to 1, the torque command Tm1* of the motor MG1 is set to make the rotation speed Ne of the engine 22 approach to the target rotation speed Ne* in the state of continued combustion (firing) in the engine 22. The torque command Tm2* of the motor MG2 is then set in the range of the input limit Win of the battery 50. One possible modification may first set the torque command Tm2* of the motor MG2 in the range of the input limit Win of the battery 50 based on the braking torque demand Tr* and then set the torque command Tm1* of the motor MG1 to make the rotation speed Ne of the engine 22 approach to the target rotation speed Ne* in the state of continued combustion (firing) in the engine 22. In this modified braking control, when the torque command Tm2* of the motor MG2 is restricted to the input limit Win of the battery 50 or is set very close to the input limit Win of the battery 50, the charge level of the battery 50 may exceed the input limit Win by the electric power generated by the motor MG1. The excessive charge level may damage the battery 50 and thereby cause slight deterioration of the catalyst. A possible measure against such a possible deterioration temporarily stops the fuel injection in the engine 22 and changes the rotation speed Ne of the engine 22 toward the target rotation speed Ne*. This modification is described below as a hybrid vehicle 20B in a second embodiment of the invention.

Figure 8:
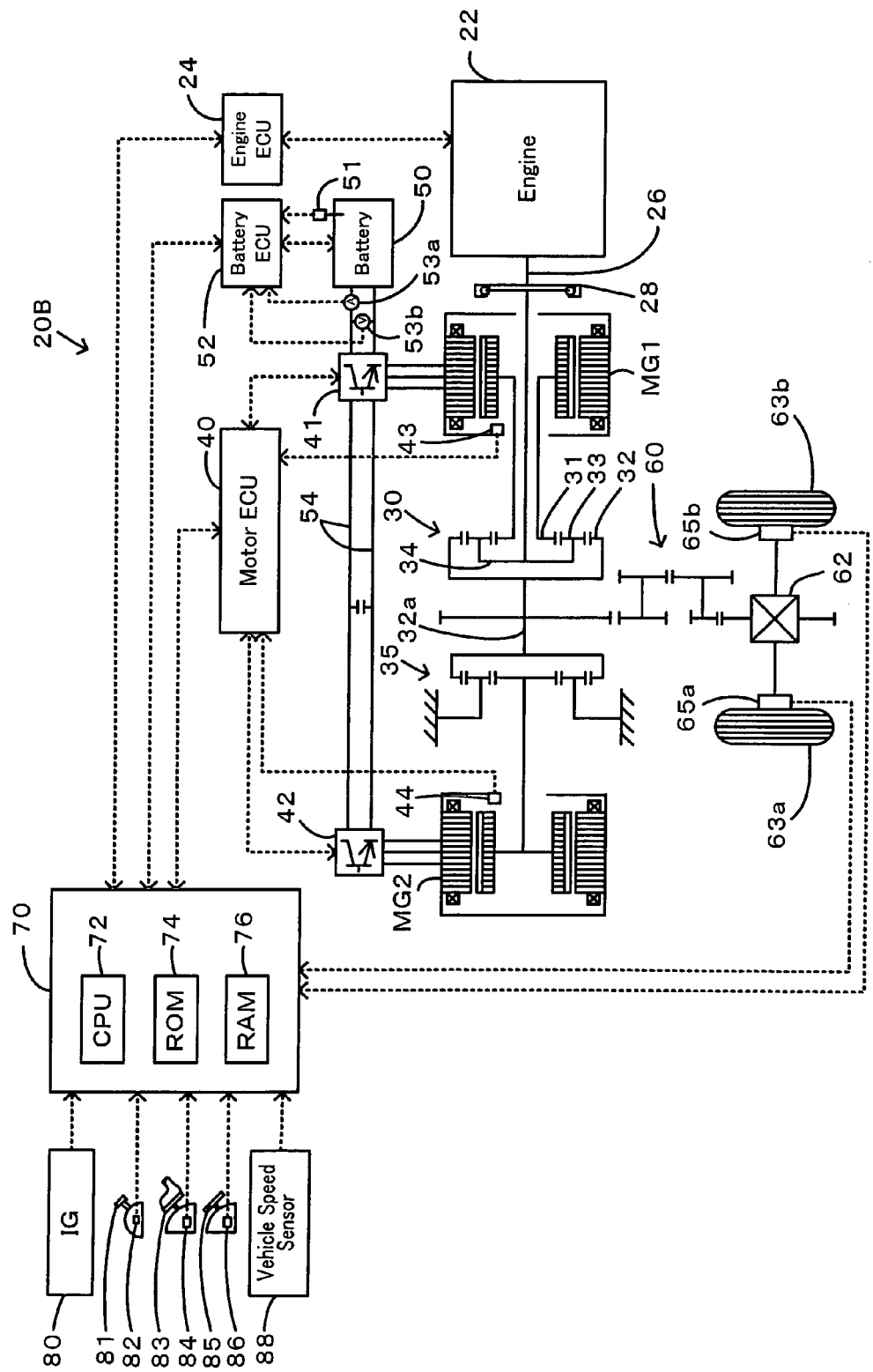
FIG. 8 schematically illustrates the configuration of another hybrid vehicle 20B equipped with a power output apparatus in a second embodiment of the invention.

FIG. 8 schematically illustrates the configuration of the hybrid vehicle 20B equipped with a power output apparatus in the second embodiment of the invention. As illustrated, the hybrid vehicle 20B of the second embodiment has the same configuration as that of the hybrid vehicle 20 of the first embodiment with explicitly showing a current sensor 53a located in the vicinity of the output terminal of the battery 50 to detect a charge-discharge electric current Ib for charging the battery 50 or being discharged from the battery 50 and a voltage sensor 53b to detect an inter-terminal voltage vb (battery voltage) of the battery 50. In order to avoid the duplicated explanation, the like elements in the hybrid vehicle 20B of the second embodiment to those in the hybrid vehicle 20 of the first embodiment are expressed by the like numerals and symbols and are not specifically described here.

Figure 9:
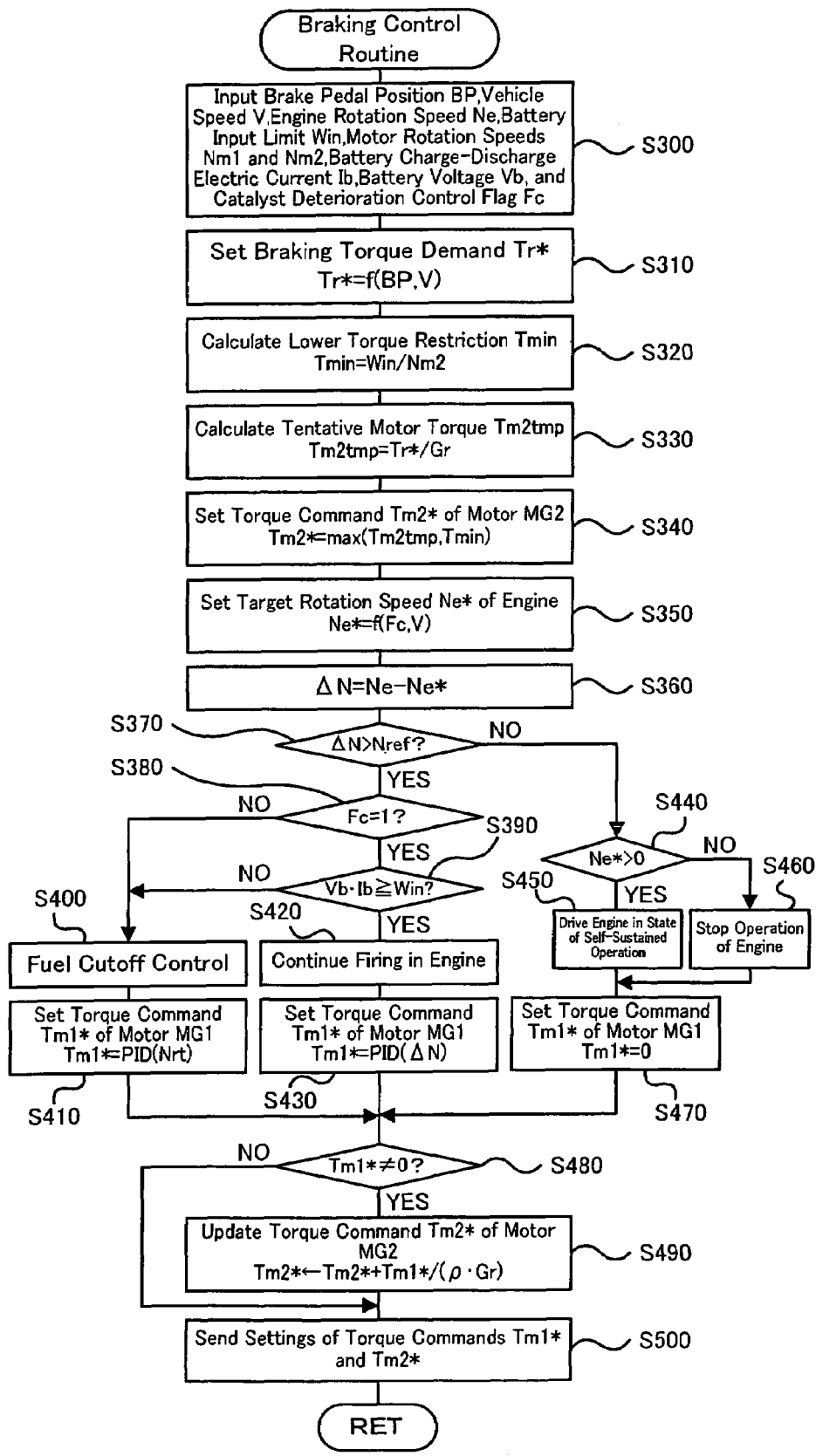
FIG. 9 is a flowchart showing a braking control routine executed by the hybrid electronic control unit 70 in the second embodiment.
Figure 10:
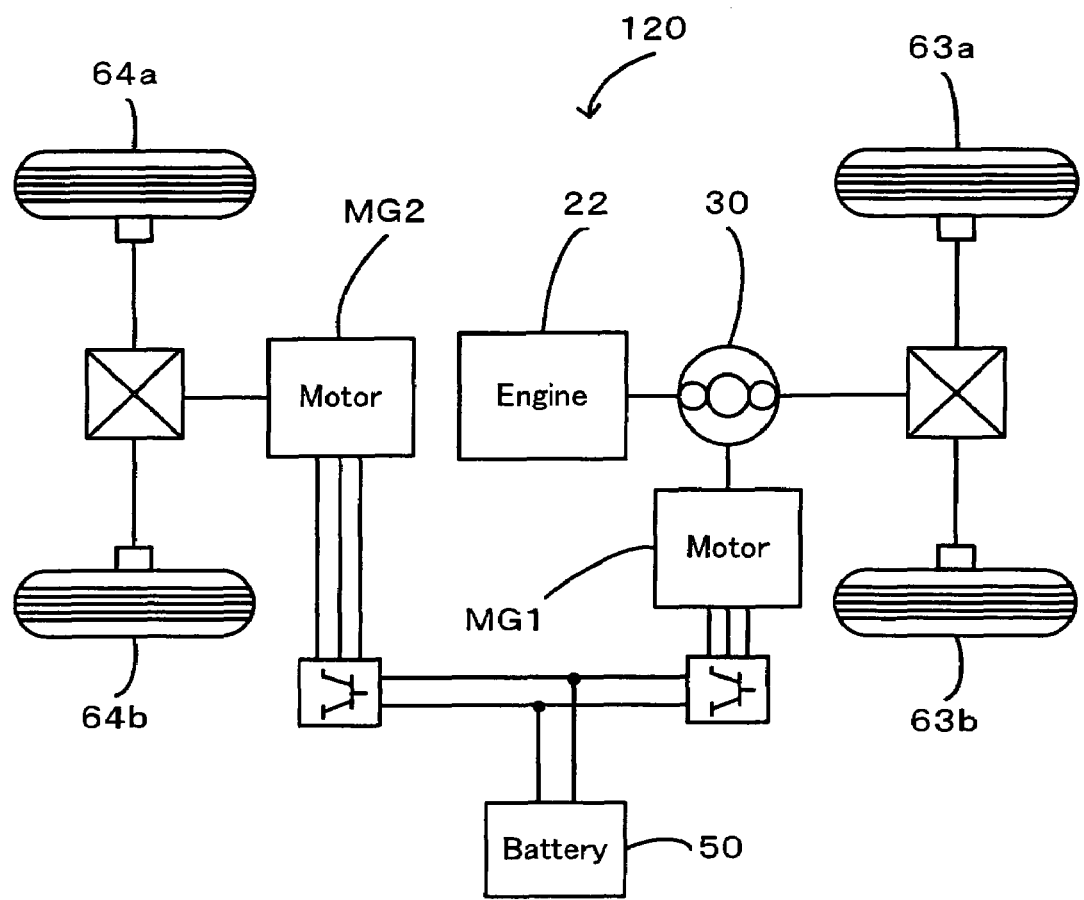
FIG. 10 schematically illustrates the configuration of another hybrid vehicle 120 in one modified example.
Figure 11:
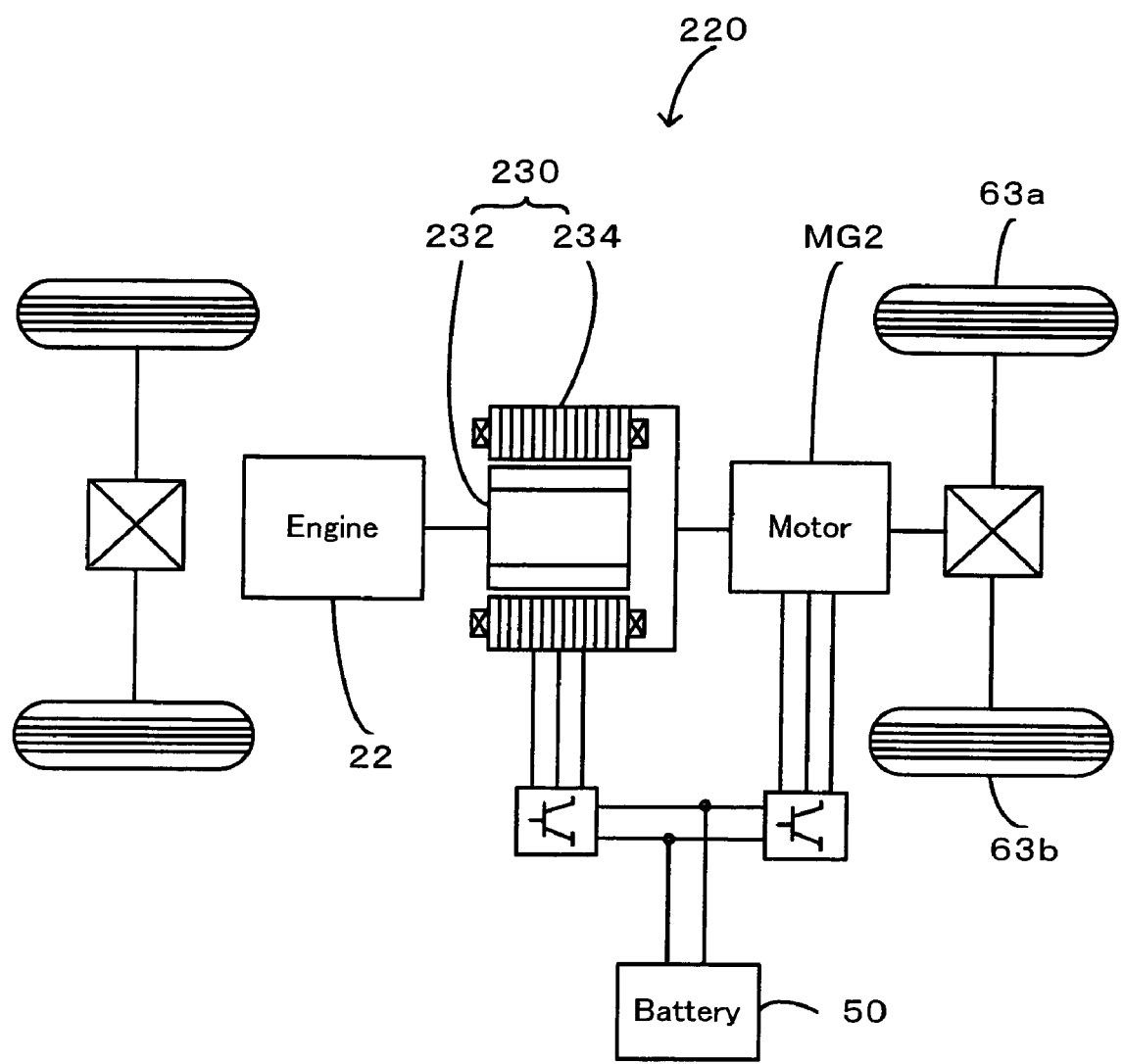
FIG. 11 schematically illustrates the configuration of still another hybrid vehicle 220 in another modified example.

The hybrid vehicle 20B of the second embodiment executes a braking control routine shown in FIG. 9, in place of the braking control routine of FIG. 3. In the braking control routine of FIG. 9, the CPU 72 of the hybrid electronic control unit 70 first inputs various data required for control, that is, the brake pedal position BP from the brake pedal position sensor 86, the vehicle speed V from the vehicle speed sensor 88, the rotation speed Ne of the engine 22, the rotation speeds Nm1 and Nm2 of the motors MG1 and MG2, the setting of the catalyst deterioration control flag Fc, the input limit Win of the battery 50, and the charge-discharge electric current Ib and the battery voltage Vb of the battery 50 (step S300). The CPU 72 subsequently sets the braking torque demand Tr* to be output to the ring gear shaft 32a or the driveshaft linked to the drive wheels 63a and 63b as the braking torque required for the hybrid vehicle 20 based on the input brake pedal position BP and the input vehicle speed V according to the braking torque demand setting map shown in FIG. 4 (step S310). The charge-discharge electric current Ib of the battery 50 is detected by the current sensor 53a and is received from the battery ECU 52 by communication. The battery voltage Vb of the battery 50 is detected by the voltage sensor 53b and is received from the battery ECU 52 by communication. The other input data, that is, the rotation speed Ne of the engine 22, the rotation speeds Nm1 and Nm2 of the motors MG1 and MG2, the catalyst deterioration control flag Fc, and the input limit Win of the battery 50, are described previously in the first embodiment.

The CPU 72 then divides the input limit Win of the battery 50 by the rotation speed Nm2 of the motor MG2 to calculate the lower torque restriction Tmin as the minimum torque that may be output from the motor MG2 (step S320), and divides the braking torque demand Tr* by the gear ratio Gr of the reduction gear 35 to calculate the tentative motor torque Tm2tmp (step S330). The torque command Tm2* of the motor MG2 is then set by limiting the calculated tentative motor torque Tm2tmp to the calculated lower torque restriction Tmin (step S340). The CPU 72 then executes the processing of steps S350 to S370, which is equivalent to the processing of steps S120 to S140 in the braking control routine of FIG. 3. The CPU 72 sets the target rotation speed Ne* of the engine 22 based on the setting of the catalyst deterioration control flag Fc and the vehicle speed V (step S350), calculates the rotation speed difference ΔN between the input rotation speed Ne and the set target rotation speed Ne* of the engine 22 (step S360), and compares the calculated rotation speed difference ΔN with the predetermined threshold value Nref (step S370). When the rotation speed difference ΔN is greater than the predetermined threshold value Nref, it is identified whether the catalyst deterioration control flag Fc is equal to 1 (step S380). Upon identification of the catalyst deterioration control flag Fc equal to 0, it is determined that the catalyst deterioration control is not required. The CPU 72 accordingly instructs the engine ECU 24 to perform the fuel cutoff control and temporarily stop the fuel supply to the engine 22 (step S400) and calculates and sets the torque command Tm1* of the motor MG1 according to Equation (4) given below to change the rotation speed Ne of the engine 22 toward the target rotation speed Ne* by a specific rotation speed Nrt (step S410)

$$Tm1^* = k3 \cdot Nr + k4 \int Nr \cdot dt \tag{4}$$

The specific rotation speed Nrt represents a variation of the rotation speed Ne in order to prevent an abrupt change of the rotation speed Ne of the engine 22 and is determined, for example, according to the frequency of activation of the braking control routine. Equation (4) is a relational expression of feedback control to change the rotation speed Ne of the engine 22 by the specific rotation speed Nrt per unit time with the cutoff of fuel to the engine 22. In Equation (4) given above, 'k3' in the first term and 'k4' in the second term on the right side respectively denote a gain of the proportional and a gain of the integral term. Changing the rotation speed Ne of the engine 22 toward the target rotation speed Ne* by the specific rotation speed Nrt per unit time effectively prevents an abrupt change of the rotation speed Ne of the engine 22. The driver may release the accelerator pedal 83 or lightly step on the brake pedal 85 during operation of the engine 22 at a relatively high rotation speed. In this case, the fuel cutoff control slowly lowers the rotation speed Ne of the engine 22. The torque command Tm1* of the motor MG1 is set to restrict the decrease in rotation speed Ne of the engine 22. Namely the motor MG1 consumes electric power at the high rotation speed Ne of the engine 22, while regenerates the electric power at the low rotation speed Ne of the engine 22.

After setting the torque command Tm1* of the motor MG1, it is identified whether the torque command Tm1* is equal to 0 (step S480). When the torque command Tm1* is not equal to 0, the torque command Tm2* of the motor MG2 is updated (step S490). The concrete procedure divides a torque (Tm1*/ρ), which is applied to the ring gear shaft 32a corresponding to the torque output from the motor MG1, by the gear ratio Gr of the reduction gear 35 and adds the result of the division to the current torque command Tm2* of the motor MG2 to update the torque command Tm2*. Updating the torque command Tm2* of the motor MG2 effectively restricts a torque change by the operation of the motor MG1.

The CPU 72 then sends the settings of the torque commands Tm1* and Tm2* to the motor ECU 40 (step S500) and exits from the braking control routine.

Upon identification of the catalyst deterioration control flag Fc equal to 1 at step S380, it is determined that the catalyst deterioration control is required. In this case, the product of the charge-discharge electric current Ib and the battery voltage Vb of the battery 50, that is, a charge-discharge power Pb of the battery 50, is compared with the input limit Win of the battery 50 (step S390). When the input limit Win of the battery 50 is sufficiently small (has a sufficiently large absolute value), the charge-discharge power Pb is greater than the input limit Win (has a smaller absolute value than that of the input limit Win). When the input limit Win of the battery 50 is relatively large (has a relatively small absolute value), the charge-discharge power Pb may be smaller than the input limit Win (may have a greater absolute value than that of the input limit Win), based on the setting of the torque command Tm1* of the motor MG1 and the subsequent updating of the torque command Tm2* of the motor MG2. The comparison of step S390 identifies this state as described later in detail.

When the charge-discharge power Pb of the battery 50 is greater than the input limit Win of the battery 50 (has a smaller absolute value than that of the input limit Win), the CPU 72 instructs the engine ECU 24 to continue the combustion (firing) in the engine 22 (step S420). The CPU 72 subsequently computes and sets the torque command Tm1* of the motor MG1 according to Equation (3) given above to make the rotation speed Ne of the engine 22 approach to the target rotation speed Ne* in the state of continued combustion (step S430). The CPU 72 then updates the torque command Tm2* of the motor MG2 according to the torque command Tm1* of the motor MG1 (steps S480 and S490), sends the settings of the torque commands Tm1* and Tm2* of the motors MG1 and MG2 to the motor ECU 40 (step S500), and exits from this braking control routine as described previously.

When the charge-discharge power Pb of the battery 50 is smaller than the input limit Win of the battery 50 (has a greater absolute value than that of the input limit Win), on the other hand, it is impossible to make the rotation speed Ne of the engine 22 approach to the target rotation speed Ne* in the state of continued combustion in the engine 22. The CPU 72 accordingly instructs the engine ECU 24 to perform the fuel cutoff control and temporarily stop the fuel supply to the engine 22 (step S400) and calculates and sets the torque command Tm1* of the motor MG1 according to Equation (4) given above to change the rotation speed Ne of the engine 22 toward the target rotation speed Ne* by the specific rotation speed Nrt (step S410). The CPU 72 then updates the torque command Tm2* of the motor MG2 according to the torque command Tm1* of the motor MG1 (steps S480 and S490), sends the settings of the torque commands Tm1* and Tm2* of the motors MG1 and MG2 to the motor ECU 40 (step S500), and exits from this braking control routine. In the control of making the rotation speed Ne of the engine 22 approach to the target rotation speed Ne* in the state of continued combustion in the engine 22, the motor MG1 regenerates electric power at the high rotation speed Ne of the engine 22 and consumes electric power at the low rotation speed Ne of the engine 22. When the charge-discharge power Pb of the battery 50 is smaller than the input limit Win of the battery 50, the engine 22 has the high rotation speed Ne to cause regeneration of electric power by the motor MG1. A stop of regeneration of electric power by the motor MG1 prevents the charge-discharge power Pb of the battery 50 from being lowered than the input limit Win of the battery 50 but keeps the engine 22 driven at the high rotation speed Ne. The control procedure of the second embodiment performs the fuel cutoff control and temporarily stops the fuel supply to the engine 22 even at the expense of slight deterioration of the catalyst bed, in order to decrease the rotation speed Ne of the engine 22 to the target rotation speed Ne* without overcharge of the battery 50 with excess electric power. The operation of the motor MG1 is controlled to prevent an abrupt change of the rotation speed Ne of the engine 22 by the fuel cutoff control. The motor MG1 continuously consumes electric power until a decrease in rotation speed Ne of the engine 22 to a sufficiently low level. Such control effectively restrains overcharge of the battery 50 with excess electric power.

Regardless of the requirement or the non-requirement for the catalyst deterioration control, when it is determined at step S370 that the rotation speed difference ΔN is not greater than the predetermined threshold value Nref, the CPU 72 checks the setting of the target rotation speed Ne* (step S440). When the target rotation speed Ne* is not equal to 0, the CPU 72 instructs the engine ECU 24 to drive the engine 22 in the state of self-sustained operation at the target rotation speed Ne* without torque output (step S450). When the target rotation speed Ne* is equal to 0, on the other hand, the CPU 72 instructs the engine ECU 24 to stop the operation of the engine 22 (step S460). The CPU 72 then sets '0' to the torque command Tm1* of the motor MG1 (step S470), and sends the settings of the torque commands Tm1* and Tm2* of the motors MG1 and MG2 to the motor ECU 40 (step S500). The braking control routine is then terminated. When the target rotation speed Ne* is not equal to 0, the engine 22 is driven in the state of self-sustained operation at the target rotation speed Ne*.

In the hybrid vehicle 20B of the second embodiment described above, when the charge-discharge power Pb of the battery 50 becomes smaller than the input limit Win of the battery 50 (has a greater absolute value than that of the input limit Win) in the course of control of making the rotation speed Ne of the engine 22 approach to the target rotation speed Ne* in the state of continued combustion in the engine 22, it is impossible to make the rotation speed Ne of the engine 22 approach to the target rotation speed Ne* in the state of continued combustion in the engine 22. The fuel cutoff control is accordingly performed to temporarily stop the fuel supply to the engine 22. This arrangement ensures a decrease of the rotation speed Ne of the engine 22 to the target rotation speed Ne* without overcharge of the battery 50 with excess electric power. The operation of the motor MG1 is controlled to change the rotation speed Ne of the engine 22 by the specific rotation speed Nrt per unit time. Such control effectively prevents an abrupt change of the rotation speed Ne of the engine 22 and avoids potential troubles caused by the abrupt change of the rotation speed Nrt of the engine 22, for example, a potential torque shock. In response to the driver's release of the accelerator pedal 83 and subsequent depression of the brake pedal 85 in requirement for the catalyst deterioration control with the catalyst deterioration control flag Fc set equal to 1, the motor MG1 is controlled to make the rotation speed Ne of the engine 22 approach to the target rotation speed Ne* in the state of continued combustion (firing) in the engine 22. Such control ensures a quick decrease of the rotation speed Ne of the engine 22 to the target rotation speed Ne* without deterioration of the catalyst bed, thus effectively reducing the wasteful fuel consumption and enhancing the overall energy efficiency of the hybrid vehicle 20B.

In the hybrid vehicle 20B of the second embodiment described above, when the charge-discharge power. Pb of the battery 50 becomes smaller than the input limit Win of the battery 50 (has a greater absolute value than that of the input limit Win) in the course of control of making the rotation speed Ne of the engine 22 approach to the target rotation speed Ne* in the state of continued combustion in the engine 22, the fuel cutoff control is performed as mentioned above. The operation of the motor MG1 is controlled during the fuel cutoff control to change the rotation speed Ne of the engine 22 by the specific rotation speed Nrt per unit time. One modified procedure may set the torque command Tm1* of the motor MG1 equal to 0 and omit the control of the motor MG1 described above.

In the hybrid vehicles 20 and 20B of the first and second embodiment, the power of the motor MG2 is subjected to gear change by the reduction gear 35 and is output to the ring gear shaft 32a. In one possible modification shown as a hybrid vehicle 120 of FIG. 8, the power of the motor MG2 may be output to another axle (that is, an axle linked with wheels 64a and 64b), which is different from an axle connected with the ring gear shaft 32a (that is, an axle linked with the wheels 63a and 63b).

In the hybrid vehicle 20 and 20B of the first and second embodiment, the power of the engine 22 is output via the power distribution integration mechanism 30 to the ring gear shaft 32a functioning as the drive shaft linked with the drive wheels 63a and 63b. In another possible modification of FIG. 9, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The above embodiments regard the hybrid vehicles 20 and 20B. The power output apparatus performing the catalyst deterioration control is not restricted to these hybrid vehicles but may be mounted on various moving bodies including automobiles, other vehicles, ships and boats, and aircraft or may be incorporated in stationary equipment, such as construction machines. The technique of the invention may also be actualized as a control method of such a power output apparatus.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of the power output apparatuses and the automobiles.

The invention claimed is:

1. A power output apparatus that outputs power to a driveshaft, the power output apparatus comprising:
    an internal combustion engine;
    an electric power-mechanical power input output structure that is connected to an output shaft of the internal combustion engine and to the driveshaft and outputs at least part of output power of the internal combustion engine to the driveshaft through input and output of electric power and mechanical power;
    a motor that inputs and outputs power to and from the driveshaft;
    an accumulator unit that transmits electric power from and to the electric power-mechanical power input output structure and the motor;
    a driving force demand setting module that sets a driving force demand to be output to the driveshaft;
    a target operating condition setting module that, upon failure of a continued combustion condition of continuing combustion in the internal combustion engine, sets a target operating condition of the internal combustion engine including an intermittent operation of the internal combustion engine based on the set driving force demand, while upon satisfaction of the continued combustion condition, continuing operation of the internal combustion engine and setting the target operating condition of the internal combustion engine based on the set driving force demand; and
    a control module that, in a state other than a specific driving state of applying a braking force or a small load to the driveshaft upon satisfaction of the continued combustion condition, performs continued medium-high load combustion control which controls the internal combustion engine, the electric power-mechanical power input output structure, and the motor to drive the internal combustion engine in the set target operating condition and to ensure output of a driving force equivalent to the set driving force demand to the driveshaft,
    in the specific driving state, the control module performing continued low load combustion control which controls the internal combustion engine, the electric power-mechanical power input output structure, and the motor to drive the internal combustion engine in the set target operating condition with continued combustion in the internal combustion engine and to ensure output of a driving force equivalent to the set driving force demand to the driveshaft.

2. The power output apparatus in accordance with claim 1, wherein in the specific driving state, the target operating condition setting module sets the target operating condition of the internal combustion engine to a preset driving condition of attaining self-sustained operation of the internal combustion engine at a preset rotation speed.

3. The power output apparatus in accordance with claim 1, wherein in the specific driving state, the control module controls the internal combustion engine, the electric power-mechanical power input output structure, and the motor to change an operating condition of the internal combustion engine in a range of allowing continued combustion of the internal combustion engine and thereby make the operating condition of the internal combustion engine approach to the set target operating condition.

4. The power output apparatus in accordance with claim 3, wherein in the specific driving state, the control module controls the internal combustion engine, the electric power-mechanical power input output structure, and the motor to change the operating condition of the internal combustion engine to the set target operating condition by a preset rotation speed per unit time.

5. The power output apparatus in accordance with claim 1, the power output apparatus further having:
    an input limit setting module that sets an input limit of the accumulator unit as a maximum power level of allowing charge of the accumulator unit, based on a state of the accumulator unit,
    wherein the control module controls the internal combustion engine, the electric power-mechanical power input output structure, and the motor in a range of the set input limit of the accumulator unit.

6. The power output apparatus in accordance with claim 5, the power output apparatus further having:
    a charge-discharge electric power detector that measures a charge-discharge electric power of charging the accumulator unit or being discharged from the accumulator unit,
    wherein when execution of the continued low load combustion control to limit the measured charge-discharge electric power in the range of the set input limit of the accumulator unit in the specific driving state makes it impossible to drive the internal combustion engine in the set target operating condition, the control module performs fuel cutoff control of stopping fuel injection in the internal combustion engine to enable the internal combustion engine to be driven in the target operating condition.

7. The power output apparatus in accordance with claim 6, wherein the control module controls the internal combustion engine, the electric power-mechanical power input output structure, and the motor to change a rotation speed of the internal combustion engine by a preset rotation speed per unit time in the course of the fuel cutoff control of stopping fuel injection in the internal combustion engine to enable the internal combustion engine to be driven in the target operating condition.

8. The power output apparatus in accordance with claim 1, wherein the internal combustion engine is equipped with an emission control device that uses a catalyst for exhaust emission control, and
    the continued combustion condition is a condition of performing catalyst deterioration control to restrict deterioration of the catalyst used in the emission control device.

9. The power output apparatus in accordance with claim 1, wherein the electric power-mechanical power input output structure has: a three shaft-type power input output mechanism that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

10. A vehicle, comprising:
    an internal combustion engine;
    an electric power-mechanical power input output structure that is connected to an output shaft of the internal combustion engine and to a driveshaft linked to an axle and outputs at least part of output power of the internal combustion engine to the driveshaft through input and output of electric power and mechanical power;
    a motor that inputs and outputs power to and from the driveshaft;
    an accumulator unit that transmits electric power from and to the electric power-mechanical power input output structure and the motor;
    a driving force demand setting module that sets a driving force demand to be output to the driveshaft;
    a target operating condition setting module that, upon failure of a continued combustion condition of continuing combustion in the internal combustion engine, sets a target operating condition of the internal combustion engine including an intermittent operation of the internal combustion engine based on the set driving force demand, while upon satisfaction of the continued combustion condition, continuing operation of the internal combustion engine and setting the target operating condition of the internal combustion engine based on the set driving force demand; and
    a control module that, in a state other than a specific driving state of applying a braking force or a small load to the driveshaft upon satisfaction of the continued combustion condition, performs continued medium-high load combustion control which controls the internal combustion engine, the electric power-mechanical power input output structure, and the motor to drive the internal combustion engine in the set target operating condition and to ensure output of a driving force equivalent to the set driving force demand to the driveshaft,
    in the specific driving state, the control module performing continued low load combustion control which controls the internal combustion engine, the electric power-mechanical power input output structure, and the motor to drive the internal combustion engine in the set target operating condition with continued combustion in the internal combustion engine and to ensure output of a driving force equivalent to the set driving force demand to the driveshaft.

11. A control method of a power output apparatus, the power output apparatus having: an internal combustion engine; an electric power-mechanical power input output structure that is connected to an output shaft of the internal combustion engine and to the driveshaft and outputs at least part of output power of the internal combustion engine to the driveshaft through input and output of electric power and mechanical power; a motor that inputs and outputs power to and from the driveshaft; and an accumulator unit that transmits electric power from and to the electric power-mechanical power input output structure and the motor,
    the control method of the power output apparatus comprising the steps of:
    (a) upon failure of a continued combustion condition of continuing combustion in the internal combustion engine, setting a target operating condition of the internal combustion engine including an intermittent operation of the internal combustion engine based on a driving force demand that is to be output to the driveshaft, while upon satisfaction of the continued combustion condition, continuing operation of the internal combustion engine and setting the target operating condition of the internal combustion engine based on the driving force demand; and
    (b) in a state other than a specific driving state of applying a braking force or a small load to the driveshaft upon satisfaction of the continued combustion condition, performing continued medium-high load combustion control which controls the internal combustion engine, the electric power-mechanical power input output structure, and the motor to drive the internal combustion engine in the set target operating condition and to ensure output of a driving force equivalent to the driving force demand to the driveshaft,
    in the specific driving state, performing continued low load combustion control which controls the internal combustion engine, the electric power-mechanical power input output structure, and the motor to drive the internal combustion engine in the set target operating condition with continued combustion in the internal combustion engine and to ensure output of a driving force equivalent to the driving force demand to the driveshaft.

12. The control method of the power output apparatus in accordance with claim 11, wherein when execution of the continued low load combustion control to limit a charge-discharge electric power of charging the accumulator unit or being discharged from the accumulator unit in the range of an input limit of the accumulator unit in the specific driving state makes it impossible to drive the internal combustion engine in the set target operating condition, the step (b) performs fuel cutoff control of stopping fuel injection in the internal combustion engine to enable the internal combustion engine to be driven in the target operating condition.

\* \* \* \* \*